United States Patent [19]

Yanagawa et al.

[11] Patent Number: 5,390,267
[45] Date of Patent: Feb. 14, 1995

[54] OPTICAL FIBER/TERMINAL CONNECTING DEVICE

[75] Inventors: Hisaharu Yanagawa; Takeo Shimizu, both of Tokyo, Japan

[73] Assignee: The Furukawa Electric Co., Ltd., Tokyo, Japan

[21] Appl. No.: 184,781

[22] Filed: Jan. 21, 1994

Related U.S. Application Data

[63] Continuation of Ser. No. 932,340, Aug. 19, 1992, abandoned.

[30] Foreign Application Priority Data

Aug. 21, 1991 [JP] Japan ................... 3-234112
Aug. 22, 1991 [JP] Japan ................... 3-235492

[51] Int. Cl.⁶ ........................................... G02B 6/30
[52] U.S. Cl. ............................... 385/49; 385/14;
385/24; 385/52; 385/50; 385/76; 385/77;
385/88; 385/89; 385/82
[58] Field of Search .................. 385/49, 52, 58, 70,
385/88, 89, 46, 48, 64, 82, 139, 52, 24, 59, 14,
50, 76, 77, 130, 132; 250/227.11

[56] References Cited

U.S. PATENT DOCUMENTS

| | | | |
|---|---|---|---|
| 4,217,030 | 8/1980 | Howarth | 385/64 X |
| 4,341,439 | 7/1982 | Hodge | 385/64 X |
| 4,474,425 | 10/1984 | Kaede | 385/49 X |
| 4,597,631 | 7/1986 | Flores | 385/59 |
| 4,930,858 | 6/1990 | Veenendaal | 385/52 |
| 5,015,059 | 5/1991 | Booth et al. | 385/49 X |
| 5,080,458 | 1/1992 | Hockaday | 385/49 |
| 5,133,032 | 7/1992 | Salter et al. | 385/60 |
| 5,155,785 | 10/1992 | Holland et al. | 385/49 X |
| 5,195,154 | 3/1993 | Uchida | 385/88 |
| 5,199,093 | 3/1993 | Longhurst | 385/88 |
| 5,208,885 | 5/1993 | Dragone et al. | 385/49 |
| 5,216,732 | 6/1993 | Knott | 385/59 |
| 5,325,451 | 6/1994 | Hartman et al. | 385/49 |

FOREIGN PATENT DOCUMENTS

| | | | |
|---|---|---|---|
| 0283301 | 9/1988 | European Pat. Off. | |
| 0310535 | 4/1989 | European Pat. Off. | |
| 4002370A1 | 8/1991 | Germany | |
| 59-116705 | 7/1984 | Japan | 385/49 X |
| 60-17406 | 1/1985 | Japan | 385/49 X |
| 61-173205 | 8/1986 | Japan | 385/49 X |
| 62-17712 | 1/1987 | Japan | 385/49 X |
| 62-70807 | 4/1987 | Japan | 385/64 X |
| 63-205617 | 8/1988 | Japan | 385/49 X |
| 64-57212 | 3/1989 | Japan | 385/49 X |
| 1-142511 | 6/1989 | Japan | 385/64 X |
| 1-149008 | 6/1989 | Japan | 385/64 x |
| 1-211703 | 8/1989 | Japan | 385/64 X |

*Primary Examiner*—Brian Healy
*Attorney, Agent, or Firm*—Frishauf, Holtz, Goodman & Woodward

[57] ABSTRACT

An optical connecting device including an optical waveguide substrate having a plurality of optical waveguides, at least two fiber arranging members connected to at least one connecting end surface of the optical waveguide substrate, and an optical fiber disposed in the position controlling means of the fiber arranging members, wherein the connecting end surfaces of the optical wave guides and the optical fiber are brought in contact with each other, thereby the optical waveguides and the optical fiber are optically connected to each other. An optical connecting device including a first optical connector having a plurality of hole groups formed of a first fiber through hole and a pair of first positioning pin holes provided in both sides of the first fiber through hole, and a first optical fiber inserted into the first through hole such that its connecting end surface is exposed, a plurality of second optical connectors having a second fiber through hole and a pair of second positioning pin holes provided in both sides of the second fiber through hole, and a second optical fiber inserted into the second through hole such that its connecting end surface is exposed, and positioning pins inserted into first and second positioning pin holes, wherein the connecting end surfaces of of the first and second optical connectors are brought into contact with each other.

7 Claims, 2 Drawing Sheets

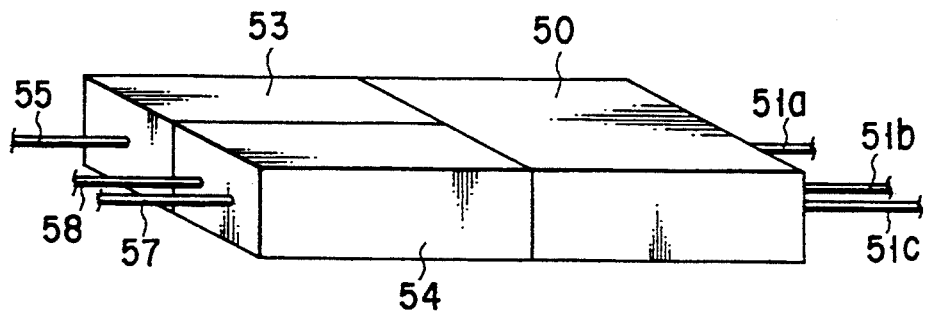
FIG. 5
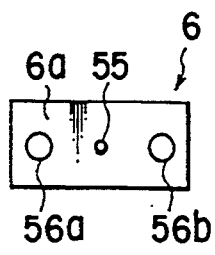 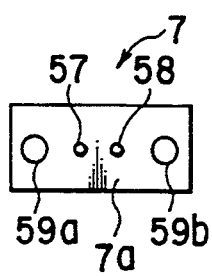 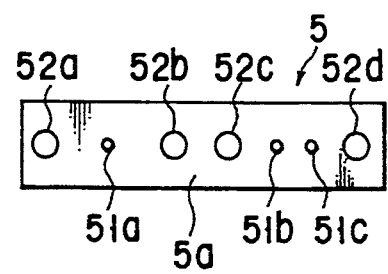
FIG. 6A   FIG. 6B   FIG. 6C
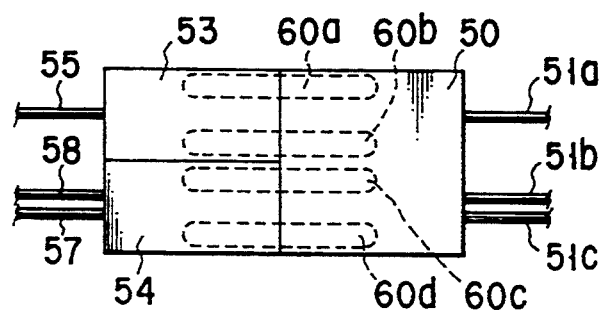
FIG. 7

OPTICAL FIBER/TERMINAL CONNECTING DEVICE

This application is a Continuation of application Ser. No. 07/932,340, filed Aug. 19, 1992, now abandoned.

BACKGROUND OF THE INVENTION

1. Field of the Invention

The present invention relates to an optical connecting device to be used in the field of an optical communication.

2. Description of the Related Art

A conventional optical branching coupler has the structure as shown in FIG. 1. In the drawing, reference numeral 10 denotes an optical waveguide chip. An optical branch coupling wave guide 11 is formed in the optical waveguide chip 10. The optical branch coupling wave guide 11 comprises an optical wave guides 11a and 11b. The optical wave guides 11a and 11b are formed to be made close to each other at a central part of the optical waveguide chip 10. Optical fibers 12a to 12d are optically connected to the end portion of the optical branch coupling wave guide 11. In this case, a length L, which is made both wave guides close to each other, is determined by what degree the optical wave guides 11a and 11b are made close to each other and a wavelength of an optical signal. Thereby, for example, a distribution rate, that is, what degree the optical signal to be inputted from the optical fiber 12a is distributed to optical fibers 12c and 12d, is determined. Therefore, the optical branching couplers having various distribution rates can be designed by changing the degree of how much the optical wave guides are made close to each other and the length L. In conventional, for example, the optical fibers 12a and 12b in the input side are provided at the same transmitting location by an optical fiber code or an optical cable, and the optical fibers 12c and 12d in the output side are provided at the same receiving location by the optical fiber code and the optical cable, so that transmitting and receiving of the optical signal are performed.

However, in the conventional optical branching coupler, since a pair of the optical wave guides 11a and 11b is formed on the optical waveguide chip 10, the optical fibers 12a and 12b in the input side are provided at the same transmitting location, and the optical fibers 12c and 12d in the output side are provided at the same receiving location. Due to this, for combining the respective optical signals transmitted from the different locations or for transmitting the optically branched optical signals to the different locations, there must be increased the number of the optical branching couplers in which the optical fibers are connected to the connecting end portion of the input side and the output side, as required.

On the other hand, in a case where the optical fibers are connected by use of an optical connector device, the number of the cores of the optical fibers to be connected is set to be the same, and the connection of both optical fibers are made by use of the connector in which the optical fibers is disposed. In this case, the optical signal sent from the optical fiber in the input side is always transmitted to the optical fiber in the determined output side.

In recent years, there has been considered an optical communication system wherein a multi-core optical fiber is used in an input side and an optical signal is branched and transmitted to the different locations. However, the above-mentioned conventional optical connector cannot deal with such a new type of the optical communication system.

SUMMARY OF THE INVENTION

An object of the present invention is to provide an optical connecting device wherein an input optical signal is passed through a device such as an optical branching coupler, thereby the optical signal can be branched and transmitted to a different receiving location.

The above object can be achieved by an optical connecting device comprising an optical waveguide substrate having a plurality of optical waveguide, at least two fiber arranging members connected to at least one connecting end surface of the optical waveguide substrate, and an optical fiber disposed in the fiber arranging members, wherein the connecting end surfaces of the optical wave guides and the optical fiber are brought in contact with each other, thereby the optical waveguides and the optical fiber are optically connected to each other.

The other object of the present invention is to provide an optical connecting device wherein an input optical signal can be branched by a multi-core optical fiber and transmitted to a different receiving location.

For example, the above object can be achieved by an optical connecting device comprising a first optical connector having a plurality of hole groups formed of a first fiber through hole and a pair of first positioning pin holes provided in both sides of the first fiber through hole, and a first optical fiber inserted into the first through hole such that its connecting end surface is exposed, a plurality of second optical connectors having a second fiber through hole and a pair of second positioning pin holes provided in both sides of the second fiber through hole, and a second optical fiber inserted into the second through hole such that its connecting end surface is exposed, and positioning pins inserted into the first and second positioning pin holes, wherein the connecting end surfaces of the first and second optical connectors are brought into contact with each other, thereby the first and second optical fibers are connected to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a perspective view showing other embodiment of the optical connecting device of the present invention;

FIGS. 6A to 6C are front views showing a connecting end surface of an optical connector of the optical connecting device of FIG. 5; and FIG. 7 is a view showing the state in which two optical connectors are connected by a positioning pin.

DETAILED DESCRIPTION OF THE PREFERRED EMBODIMENTS

Figure 1:
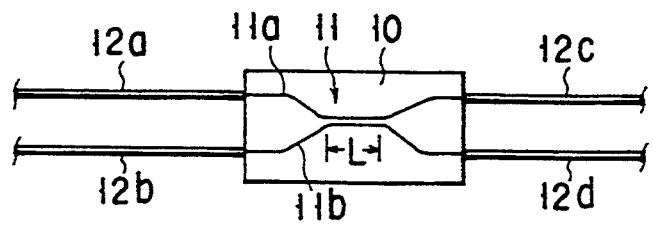
FIG. 1 is a plane view showing a conventional optical branching coupler.
Figure 2:
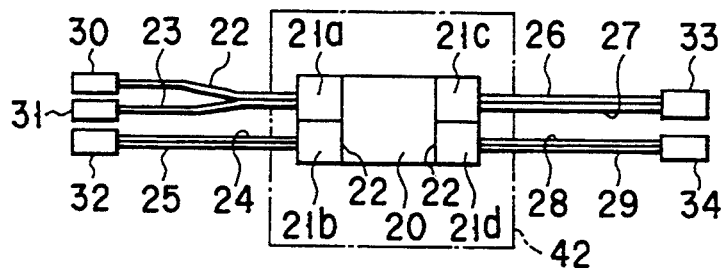
FIG. 2 is a plane view showing one embodiment of an optical connecting device of the present invention.

An embodiment of the present invention will be explained with reference to the drawings. FIG. 2 shows an optical connecting device according to the present invention.

In the drawing, reference numeral 20 is a fixing member such as a housing containing an optical waveguide chip which is used as an optical waveguide substrate. A plurality of two-core optical fiber arranging members 21a to 21d are attached to the connecting end portions of the fixing member 20 via an adhesive layer 22 formed of an optical adhesive. In each of the two-core fiber arranging members 21a to 21d, there is formed position controlling means (not shown), on which a two-core optical fiber is mounted, for controlling the position of the optical fiber, for example, a cross-sectional V-shape groove.

Figure 3:
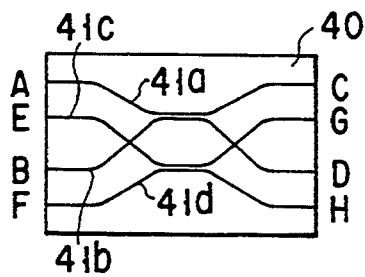
FIG. 3 is a schematic view showing a waveguide pattern of an optical branching coupler to be used in the connecting device of FIG. 2.

FIG. 3 shows one example of an optical waveguide pattern of the optical waveguide chip. On an optical waveguide chip 40, which is used as an optical waveguide substrate, there are formed a first optical branching coupling optical waveguide pattern formed of optical waveguides 41a and 41b, and a second optical branching coupling optical waveguide pattern formed of optical waveguides 41c and 41d. The first optical branching coupling optical waveguide pattern has an area where the optical waveguides 41a and 41b are close to each other, and the second optical branching coupling optical waveguide pattern has an area where the optical waveguides 41c and 41d are close to each other.

In FIG. 2, optical fibers 22 and 23 are positioned and mounted on the two-core optical fiber arranging members 21a. Optical fibers 24 and 25 are positioned and mounted on the two-core optical fiber arranging members 21b. Optical fibers 26 and 27 are positioned and mounted on the two-core optical fiber arranging members 21c. Optical fibers 28 and 29 are positioned and mounted on the two-core optical fiber arranging members 21d. One end of the optical fiber 22 is optically connected to a connecting end portion A of the optical waveguide 41a. One end of the optical fiber 23 is optically connected to a connecting end portion E of the optical waveguide 41c. One end of the optical fiber 24 is optically connected to a connecting end portion B of the optical waveguide 41b. One end of the optical fiber 25 is optically connected to a connecting end portion F of the optical waveguide 41d. One end of the optical fiber 26 is optically connected to a connecting end portion C of the optical waveguide 41a. One end of the optical fiber 27 is optically connected to a connecting end portion G of the optical waveguide 41c. One end of the optical fiber 28 is optically connected to a connecting end portion D of the optical waveguide 41b. One end of the optical fiber 29 is optically connected to a connecting end portion H of the optical waveguide 41d.

The other end of the optical fiber 22 is optically connected to a single-core optical connector 30. The other end of the optical fiber 23 is optically connected to a single-core optical connector 31. The other ends of the optical fibers 24 and 25 are optically connected to a two-core optical connector 32. The other ends of the optical fibers 26 and 27 are optically connected to a two-core optical connector 33. The other ends of the optical fibers 28 and 29 are optically connected to a two-core optical connector 34.

Figure 4:
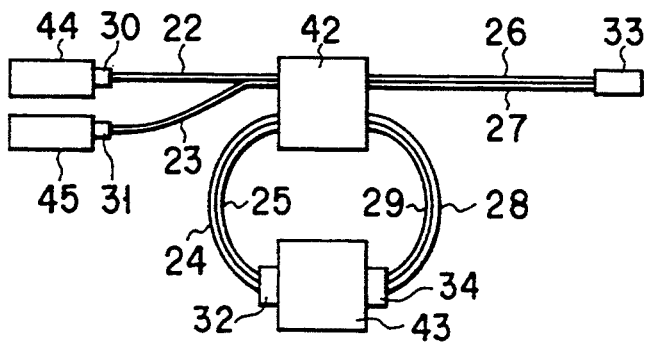
FIG. 4 is a view showing a monitoring system of an optical communication using the optical connecting device of the present invention.

According to the optical connecting device having the above-mentioned structure, for example, if the optical signals are inputted from the single-core optical connectors 30 and 31, respectively, the optical signal sent from the single-core optical connector 30 is passed through the optical fiber 22 and sent to the first optical branch-couple waveguide pattern, and the optical signal sent from the single-core optical connector 31 is passed through the optical fiber 23 and sent to the second optical branch-couple waveguide pattern. Moreover, the optical signals are branched and coupled at a rate according to the design at the closing portion where the first optical branch-couple waveguide pattern and the second optical branch-couple waveguide pattern are close to each other. The branched optical signals are sent to the predetermined optical fibers 26 to 29 of the two-core fiber arranging members 21c and 21d, respectively, and further transmitted to the different locations via the light channel connected to the two-core optical connectors 33 and 34. A desirable signal processing is performed in the above-explained manner. FIG. 4 shows a monitoring system of the optical communication using the optical connecting device according to the present invention. In the drawing, the single-core optical connectors 30 and 31 are optically connected to optical terminal equipments 44 and 45 transmitting and receiving the optical signal. Moreover, the two-core optical connector 33 is optically connected to the light channel (not shown). The optical signal passed through the optical fibers 26 and 27 is sent to the light channel via the two-core optical connector 33, and is transmitted to the desirable location, thereby performing the signal processing. Moreover, two-core optical connectors 32 and 34 are optically connected to a light monitoring device 43. In the drawing, reference numeral 42 shows an area including the fixing member 20 and the two-core optical arranging members 21a to 21d.

According to the monitoring system having the above-mentioned structure, for example, if the optical signals are inputted from the single-core optical connectors 30 and 31, respectively, the optical signal sent from the single-core optical connector 30 is inputted from an input connecting end portion A of an optical waveguide 41a and outputted to an output connecting end portion C, and is passed through the optical fiber 26, thereby performing the optical communication. Similarly, the optical signal sent from the single-core optical connector 31 is inputted from an input connecting end portion E of an optical waveguide 41c and outputted to an output connecting end portion G and is passed through the optical fiber 27, thereby performing the optical communication.

Under this state, the optical signal sent from the optical fiber 22 is branched by the first optical branch-couple waveguide, and the part of the optical signal is transmitted to an optical waveguide 41b and passed through the optical fiber 28 from the output connecting end portion D, and inputted to a light channel monitoring device 43 via the optical connector 34. Similarly, the optical signal sent from the optical fiber 23 is branched by the second optical branch-couple waveguide, and the part of the optical signal is transmitted to an optical waveguide 41d and passed through the optical fiber 29 from the output connecting end portion H, and inputted to a light channel monitoring device 43 via the optical connector 34.

As mentioned above, the part of the optical signal in the optical communication is sent to the light channel monitoring device 43. Due to this, the light channel monitoring device 43 can always monitor the optical signal whether the optical communication is normally performed or abnormality occurs in the optical communication by that the optical channel is cut by, for example, construction work. Thereby, quick treatment of repairing abnormality in the optical communication can be provided.

The above embodiment explained the use of the optical waveguide chip 40 having two optical branch-couple waveguide patterns. However, an optical waveguide chip having three or more optical branch-couple waveguide patterns may be used. Then, the optical signal branched and coupled at each optical branch-couple waveguide may be sent to the optical fiber mounted on the optical fiber arranging member. Moreover, the above embodiment explained the case in which the optical waveguide pattern is the optical branch-couple waveguide optical waveguide pattern. However, according to the present invention, the optical waveguide pattern other than the optical branch-couple optical waveguide pattern may be used.

Furthermore, the above embodiment explained the case in which the optical fiber arranging members are arranged in both connecting end portions of the optical waveguide forming substrate (optical waveguide chip). However, the optical fiber arranging member may be arranged to only one connecting end portion of the optical waveguide forming substrate.

The following will explain other embodiment of the optical connecting device according to the present invention.

In FIG. 5, reference numeral 50 shows a first optical connector. Three optical fibers 51a to 51c are inserted into he first optical connector 50. That is, as shown in FIG. 6C, the optical fibers 51a to 51c are inserted into the fiber insertion holes of a connector ferrule 5 having three fiber through holes and two positioning pin holes. The optical fibers 51a to 51c are arranged such that the connecting end surfaces of the optical fibers 51a to 51c are exposed on the connecting end surface of the connector ferrule 5. In the connector ferrule 5, a pair of positioning pin holes 52a and 52b are formed on both sides of optical fiber 51a, and a pair of positioning pin holes 52c and 52d are formed on both sides of optical fiber 51b and 51c.

Second and third optical connectors 53 and 54 are connected to the first optical connector 50. An optical fiber 55 is inserted to the second optical connector 53. That is, as shown in FIG. 6A, the optical fiber 55 is inserted into the fiber insertion hole of a ferrule 6 having a fiber through hole and a pair of positioning pin holes 56a and 56b. The optical fiber 55 is arranged such that the connecting end surface of the optical fiber 55 is exposed on the connecting end surface of the connector ferrule 6. The position of the optical fiber 55 of the second optical connector 53 and that of the pair of positioning pin holes 56a and 56b are set to correspond to the position of the optical fiber 51a of the first optical connector 50 and that of the pair of the positioning pin holes 52a and 52b, respectively. Then, the connecting end surfaces 5a of the first optical connector 5 are set to be connected to the connecting end surface 6a of the second optical connector 6.

Optical fibers 57 and 58 are inserted to the third optical connector 54. That is, as shown in FIG. 6B, the optical fibers 57 and 58 are inserted into the fiber insertion hole of a ferrule 7 having two fiber through holes and a pair of positioning pin holes 59a and 59b. The optical fibers 57 and 58 are arranged such that the connecting end surfaces of the optical fibers 57 and 58 are exposed on the connecting end surfaces of the connector ferrule 7. The positions of the optical fibers 57 and 58 of the third optical connector 54 and those of the pair of positioning pin holes 59a and 59b are set to correspond to the positions of the optical fibers 51c and 51d of the first optical connector 50 and those of the pair of the positioning pin holes 52d and 52c. Then, the connecting end surface 5a of the first connector 5 are set to be connected to the connecting end surface 7a of the third optical connector 7.

As shown in FIG. 7, the connection of the first, second and third optical connectors are made by inserting four positioning pins 60a to 60d into the positioning pin holes. In other words, one end of the positioning pin 60a is inserted into the positioning pin hole 52a of the first optical connector 50 and the other end is inserted into the positioning pin hole 56b of the second optical connector 53. One end of the positioning pin 60b is inserted into the positioning pin hole 52b of the first optical connector 50 and the other end is inserted into the positioning pin hole 56a of the second optical connector 53. One end of the positioning pin 60c is inserted into the positioning pin hole 52c of the first optical connector 50 and the other end is inserted into the positioning pin hole 59b of the third optical connector 54. One end of the positioning pin 60d is inserted into the positioning pin hole 52d of the first optical connector 50 and the other end is inserted into the positioning pin hole 59a of the third optical connector 54. In this manner, the connection between the optical fibers 51a and 55, the connection between the optical fibers 51b and 58, and the connection between the optical fibers 51c and 57 can be made without deviating the axis.

According to the above embodiment, the second and third optical connectors 53 and 54 are connected to the first optical connector 50, so that three optical fibers 51a, 51b, and 51c can be divided into the group of the optical fiber 55 and the group of the optical fibers 57 and 58. Thereby, the group of the optical fiber 55, and the group of the optical fibers 57 and 58 can be guided to the different locations.

The above embodiment explained the case in which three optical fibers 51a, 51b, 51c are inserted into the first optical connector 50. However, the number of optical fibers may be two or four or more.

Moreover, the above embodiment explained the case in which the second and third optical connectors 53 and 54 are used as divided optical connectors to be connected to the first optical connector 50 and one optical fiber 55 is inserted into the second optical connector 53, and two optical fibers 57 and 58 are inserted into the third optical connector 54. However, the number of the divided optical connectors is determined depending on the number of the optical fiber groups of the first optical connector.

Furthermore, according to the above embodiment, in the case that the first, second, and third optical connectors 5, 6, and 7 are connected, the positioning pin holes are formed in the connecting end surface of the respective connectors in advance, and the positioning pins are inserted to the positioning pin holes. However, for example, the positioning pin hole is formed in one connecting end surface and a convex portion corresponding to the shape of the positioning pin hole is formed in the other connecting end surface in advance, and both may be connected to each other without using the positioning pin.

Thermosetting resin containing glass filler, e.g., epoxy resin can be used as a material of connector of first, second, and third optical connectors, and stainless steel can be used as a material of positioning pin.

As mentioned above, according to the present invention, a plurality of optical waveguide patterns are formed on the optical waveguide forming substrate, and a plurality of optical fiber arranging members are connected to at least one connecting end surface. Due to this, the optical signals, which are branched and coupled by optical waveguide, can be transmitted to the different locations via the optical fiber. Thereby, various types of desirable signal processing can be performed, and this is extremely convenient for the use of the device.

Moreover, according to the present invention, at least two the optical connectors are connected to at least one end of one optical connector, and the plurality of the optical fibers in the side of one optical connector are branched, and connected to the optical fibers in the side of the optical connectors. Due to this, the optical signal transmitted via the plurality of the optical fibers in the side of of the one optical connector can be sent to the different locations via the optical fiber in the side of the plurality of the optical connectors. This is very useful to improve the development of the new optical communication system.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical connecting device for connecting an input thereto to an output thereof depending on a destination of said input, comprising:

an optical wave guide substrate having a plurality of optical wave guides and a plurality of input and output terminals;

a first number greater than one, of input optical fiber arranging members connected to a first connecting end surface of said optical wave guide substrate;

a second number greater than one, of output optical fiber arranging members connected to a second connecting end surface of said optical wave guide substrate;

a third number greater than zero, of input optical fibers, said third number of input optical fibers respectively having a first end thereof optically coupled to at least one of said first number of input optical fiber arranging members and having a second end thereof optically coupled to at least one of a fourth number greater than one, of optical transmitting terminal devices; and a fifth number greater than zero, of output optical fibers, said fifth number of output optical fibers respectively having a first end thereof optically coupled to at least one of said second number of output optical fiber arranging members and having a second end thereof optically coupled to at least one of a sixth number greater than one, of receiving optical devices; and wherein said first number of input optical fiber arranging members is equal in number to said fourth number of optical transmitting terminal devices;

said second number of output optical fiber arranging members is equal in number to said sixth number of optical receiving terminal devices;

a number of said plurality of optical wave guides formed in said substrate and said third number of input optical fibers are equal in number to each other; and said number of said plurality of optical wave guides formed in said substrate and said fifth number of output optical fibers are respectively optically coupled to each other.

2. The optical connecting device according to claim 1, wherein:

said optical waveguide substrate comprise a branch-type waveguide; and said first number of input optical fiber arranging members is smaller in number than said second number of output optical fiber arranging members.

3. An optical connecting device, comprising:

a first number greater than one, of first connectors, respectively having at least a first hole group that includes at least one first fiber-through-hole and a pair of first positioning pin holes, respectively positioned on opposite sides of said at least one first fiber-through-hole, and a first optical fiber inserted into said at least a first fiber-through-hole, said first optical fiber having a connecting end surface thereof exposed;

a second number greater than one, of second connectors respectively having at least one second hole group that includes at least one second fiber-through-hole and a pair of second positioning pin holes, respectively positioned on opposite sides of said at least one second fiber-through-hole, and a second optical fiber inserted into said at least a second fiber-through-hole, said second optical fiber having a connecting end surface thereof exposed; and positioning pins inserted into said first and second pairs of positioning pin holes; and wherein:

said first number of first connectors, and a third number, of optical terminal devices are equal in number to each other;

said second number of second connectors and a fourth number of second optical terminal devices are equal in number to each other; and said exposed connecting end surface of said first optical fiber and said exposed connecting end surface of said second optical fiber are respectively optically coupled to each other.

4. The optical connecting device according to claim 3, wherein:

a predetermined number of first hole groups are provided; and said second number of said second optical connectors is equal in number to said predetermined number of said first hole groups.

5. The optical connecting device according to claim 1, wherein:

said optical waveguide substrate comprises a coupling-type waveguide; and said second number of output fiber arranging members is smaller in number than said first number of input fiber arranging members.

6. The optical connecting device according to claim 1, wherein:

said first number of input fiber arranging members and said second number of output fiber arranging members include position controlling means for controlling a position of an optical fiber relative to said plurality of optical waveguides.

7. The optical connecting device according to claim 6, wherein a cross-section of said position controlling means comprises a substantially V-shape groove.

* * * * *